(12) United States Patent
VanVolkinburg

(10) Patent No.: US 9,825,448 B1
(45) Date of Patent: Nov. 21, 2017

(54) ELECTRICAL RACEWAY ASSEMBLY AND METHOD OF USING THE SAME

(71) Applicant: Clayton Dean VanVolkinburg, Byron Center, MI (US)

(72) Inventor: Clayton Dean VanVolkinburg, Byron Center, MI (US)

( * ) Notice: Subject to any disclaimer, the term of this patent is extended or adjusted under 35 U.S.C. 154(b) by 0 days.

(21) Appl. No.: 14/799,175

(22) Filed: Jul. 14, 2015

(51) Int. Cl.
*H02G 3/04* (2006.01)
*H02G 3/38* (2006.01)
*G09F 7/18* (2006.01)

(52) U.S. Cl.
CPC .............. *H02G 3/286* (2013.01); *G09F 7/18* (2013.01)

(58) Field of Classification Search
CPC ........ H02G 3/286; H02G 3/105; H02G 3/128; H02G 3/00; H02G 3/04; H02G 3/30; H02G 3/0437
USPC ............. 174/70 R, 504, 481, 503, 101, 68.3; 40/606.1, 607.13; 211/94.02, 86.01; 248/49; 362/217.01, 217.14, 217.15; 312/223.6; 108/50.02; 52/220.7
See application file for complete search history.

(56) References Cited

U.S. PATENT DOCUMENTS

| | | | |
|---|---|---|---|
| 3,725,568 A | 4/1973 | Stanley | |
| 3,927,698 A * | 12/1975 | Johannsen | ........... H02G 3/0437 138/157 |
| 4,017,137 A | 4/1977 | Parks | |
| 4,240,130 A | 12/1980 | Stilling | |
| 4,277,123 A | 7/1981 | Haworth et al. | |
| 4,627,469 A * | 12/1986 | Buard | .................. H02G 3/0425 138/117 |
| 4,907,767 A * | 3/1990 | Corsi | .................... H02G 3/0437 138/162 |
| 5,704,175 A | 1/1998 | Lewis | |
| 5,728,976 A | 3/1998 | Santucci et al. | |
| 6,107,576 A | 8/2000 | Morton et al. | |
| 6,489,556 B1 * | 12/2002 | Jauch | ..................... A47B 21/06 174/481 |
| 6,498,297 B2 | 12/2002 | Samhammer | |
| 6,528,726 B1 * | 3/2003 | Jauch | ..................... A47B 21/06 174/101 |
| 6,792,877 B2 | 9/2004 | Gutgsell et al. | |
| 8,925,746 B2 | 1/2015 | Johnson | |
| 2005/0210724 A1 | 9/2005 | Grau et al. | |

* cited by examiner

*Primary Examiner* — Dimary Lopez Cruz
(74) *Attorney, Agent, or Firm* — King & Partners, PLC

(57) ABSTRACT

An electrical raceway assembly including a substrate engaging member having an upper region, an intermediate region, a lower region, an inner surface and an outer surface; a signage engaging member having an upper region, an intermediate region, a lower region, an inner surface and an outer surface; wherein the upper region of the substrate engaging member and the upper region of the signage engaging member are releasably secured to each other; and wherein the lower region of the substrate engaging member includes a segment that regulates positioning of the lower region of the signage engaging member.

13 Claims, 8 Drawing Sheets

ELECTRICAL RACEWAY ASSEMBLY AND METHOD OF USING THE SAME

CROSS-REFERENCE TO RELATED APPLICATIONS

Not Applicable.

BACKGROUND OF THE INVENTION

1. Field of the Invention

The present invention relates in general to raceway assemblies, and, more particularly, to electrical raceway assemblies that increase assembly, installation, service, and maintenance efficiency associated with, for example, illuminated signage. The present invention further relates to methods for utilizing the electrical raceway assemblies disclosed herein.

2. Background Art

Raceway assemblies and associated accessories and components have been known in the art for years and are the subject of a plurality of patents and publications, including: U.S. Pat. No. 8,925,746 entitled "Modular Raceway System for Electrical Components," U.S. Pat. No. 6,792,877 entitled "Electrical Raceway Assembly," U.S. Pat. No. 6,498,297 entitled "Self-Closing Electrical Raceway and Dedicated Seat Track Cover," U.S. Pat. No. 6,107,576 entitled "Hinged Top Lid for Cable Channel," U.S. Pat. No. 5,728,976 entitled "Detachable Cover for Wire Ducts Having a Living Hinge," U.S. Pat. No. 5,704,175 entitled "Multi-Channel Raceway for Electric Wires, Cables and Other Elongated Utility Lines," U.S. Pat. No. 4,277,123 entitled "Raceway Structure for Power Panel," U.S. Pat. No. 4,240,130 entitled "Raceway for Sign Box," U.S. Pat. No. 4,017,137 entitled "Electrical Raceway and Receptacle Assemblies," U.S. Pat. No. 3,725,568 entitled "Electrical Ceiling Raceway," and United States Patent Application Publication Number 2005/0210724 entitled "Support for Signs Incorporating an Electrical Raceway Therefor and Sign and Method Utilizing the Same"—all of which are hereby incorporated herein by reference in their entirety including the references cited therein.

U.S. Pat. No. 8,925,746 appears to disclose a modular raceway system for electrical components that includes horizontal members to accommodate the attachment of trim, the attachment of vertical members containing slots for connecting attachment brackets and other brackets used to secure electronic devices or other objects. The raceway system appears to be used to conceal wiring and minimize the amount of holes required for wall connection points in a finished room.

U.S. Pat. No. 6,792,877 appears to disclose an electrical raceway assembly for use with a table-top structure. The raceway assembly includes an elongated raceway and a locking element. The locking element includes a first end detachably engaged to the raceway, and an opposite second end having a locking lever movable between a locked position for quickly engaging the raceway to the structure and a released position for quickly releasing the raceway from the structure. The elongated raceway has a length, a transverse base and a pair of opposite upstanding sidewalls extending along the length to define at least one open channel configured for retaining electrical wires. The raceway is engageable to the table-top structure in either a first position, wherein the raceway extends above the upper surface, or a second position, wherein the raceway extends beneath the lower surface. The raceway is further engageable in either a forward facing orientation or a reversed orientation.

U.S. Pat. No. 6,498,297 appears to disclose a protective wiring assembly that includes a raceway having a top portion, a bottom portion that is opposite the top portion, and a self-closing portion intermediate the top and bottom portions. The bottom portion has a bottom locking rib and interfaces a support on which the assembly can be disposed. The self-closing portion has a top locking rib and a top guide rib. The top locking rib is engageable to the bottom locking rib. A cover interfaces the top portion of the raceway. The cover has a pair of retention legs and a load bearing rib that transmits force from the top portion to the support.

U.S. Pat. No. 6,107,576 appears to disclose a cable channel and lid assembly having an elongate cable channel for supporting wire and/or optical cable therein and defining outwardly facing grooves adjacent the top edge of each sidewall. A hinged top lid is provided including two opposing sidewalls wherein each sidewall includes an inwardly extending portion for being received by a corresponding channel wall groove. One of the top lid side walls is substantially rigid and can be disengaging raised from its associated channel wall groove, and the other of the top lid side walls is flexible and adapted to be fixedly secured in its associated groove so as to serve as a hinge when the aforesaid opposing top lid side wall is raised.

U.S. Pat. No. 5,728,976 appears to disclose a reclosable cover for converting a two-piece electrical wire and cable duct system into a one-piece reclosable duct. The cover is fabricated from a dual-durometer plastic co-extrusion having a flexible hinge portion extruded of a resilient lower durometer plastic material. A clip assembly formed along one edge of the cover includes a modified U-shaped channel to receive and clamp the top end of a duct channel sidewall. Flexible fins are provided within this channel to further locate and retain the duct cover. A generally V-shaped hinge support member and dual ridges provide enhanced hinge integrity and an interference engagement therebetween to provide a cover remain-open type function. The clip assembly and support member share common elements to thereby improve on the space and cost efficiency of the duct cover.

U.S. Pat. No. 5,704,175 appears to disclose a multi-channel wireway in the form of an elongated housing that includes a retaining strip and a cover removably mounted to the retaining strip. The retaining strip includes a base of L-shaped profile and a series of vertically spaced and horizontally oriented parallel-elongated shelves which define a number of compartments adapted to separately receive therein different types of electric cables and wires and other utility lines such as compressed air lines. The compartments are open-ended towards the cover and are thus accessible when the cover is removed. An elongated closure plate is removably mounted to the open side of at least one compartment, such as the compartment containing the power cables, to deny direct access thereto even when the cover is removed. The shelves have various depths to provide better access thereto. The cover is gravity-supported in a closed position thereof by the retaining strip. The overall configuration of the wireway eliminated openings through which spilled substances could access the inside of the wireway with a view of facilitating cleaning operations. The cables can enter and exit the wireway through connections provided in the retaining strip and an inverted U-shaped cover is provided exteriorly of the retaining strip to protect these connections from spilled substances.

U.S. Pat. No. 4,277,123 appears to disclose a raceway structure for association with a wall panel so as to enclose and confine power and communication cables which extend longitudinally along the wall panel and longitudinally throughout several series-connected such panels. The raceway structure utilizes a pair of side covers which removably attach to the wall panel and cooperate to define a raceway for enclosing therein electrical terminals and communication cables. The raceway structure has access openings for providing convenient access to the electrical terminals, such as by permitting an electrical receptacle, power feed, or communication cable to be positioned therein or passed therethrough. The side cover has a closure integrally hinged thereto for closing the access opening when use of same is not desired, with the closure being swingable into an open position within the raceway while remaining integrally attached to the cover when use of the opening is desired, whereby different openings can be selectively utilized when desired and then closed again when use of the opening is not desired.

U.S. Pat. No. 4,240,130 appears to disclose an electrical raceway for installation in an illuminated sign box of the type having a translucent sign panel in the form of an elongated and hollow structure which provides reinforcement for such a sign box and a housing for electrical conductors. Such raceway has two series of knock-out discs for mounting both left-handed and right-handed lighting fixture receptacles. When such raceways are installed in a sign box, the lighting fixture receptacles can be mounted so that the lighting tubes extend between two such raceways completely across one of the series of knock-out discs in each such raceway thereby improving the overall illumination of the translucent sign panel, and reducing the patches of varied light intensity.

U.S. Pat. No. 4,017,137 appears to disclose an electrical raceway assembly having a channel shaped cover and a plurality of receptacles mounted in the cover. A pair of cover sidewalls have free edges bent toward one another, and longitudinally extending recesses are formed in opposite sides of the receptacles in confronting relation to the free edges on the cover sidewalls to provide a pair of by-pass conductor compartments with the free edges of the cover sidewalls serving as conductor retaining jaws. The '137 patent also appears to disclose an electrical receptacle assembly featuring a receptacle face cap removably fitted over a raised front face of the receptacle. The face cap has projecting flanges which may be interposed between the receptacle and its cover plate to secure the face cap in overlying position on the receptacle face.

U.S. Pat. No. 3,725,568 appears to disclose an electrical raceway comprising a housing which, in section, is enclosed on all sides except an opening which extends along the entire length of the housing. The opening may be closed by a removable cover plate after suitable wiring has been laid into the raceway within the housing. The housing may be of any suitable shape and, in fact, may form two separated raceways, each of which is enclosed by a removable cover. Suitable means are provided, replacing predetermined portions of the covers, for mechanically connecting electrical or telephone conduit thereto so that a suitable connection can be made between the cable within the raceway and that in the conduit. Structure, formed integral with the housing, is provided for suspension of the housing from a building ceiling in such a way that the suspension system does not interfere with access to the raceway through the cover plates. Structure for supporting a false ceiling is also formed integral with the housing and extends therefrom for holding false ceiling panels below the housing in a well-known manner.

United States Patent Application Publication Number 2005/0210724 appears to disclose a support structure for a sign that includes a longitudinal housing having a pen front and adapted to be secured to an upright surface. At least one gusset panel is oriented transversely in the interior of the housing. The gusset panel has a forwardly disposed notch facing the open front. In one embodiment, the housing includes a primary panel forming a bottom wall and a rear wall. A front panel strip is supported at the upper front of the gusset panel. End panels, which may be gussets, may be used to close the ends of the housing. The top of the housing may be open and a removable lid may be used to enclose the open top. A sign is also disclosed wherein a longitudinal faceplate extends across the open front and carries at least one display character.

While the above-identified patents and publications do appear to disclose various raceway type assemblies, as well as accessories therefore, their configurations remain non-desirous and/or problematic inasmuch as, among other things, none of the above-identified raceway assemblies appear to be configured to increase assembly, installation, service, and maintenance efficiency as associated with illuminated signage—among other things.

It is therefore an object of the present invention to provide an electrical raceway assembly that is configured to materially increase at least one of assembly, installation, service, and maintenance efficiency associated with illuminated signage.

These and other objects of the present invention will become apparent in light of the present specification, claims, and drawings.

SUMMARY OF THE INVENTION

The present invention is directed to, in one embodiment, an electrical raceway assembly, comprising, consisting essentially of and/or consisting of: (a) a substrate engaging member having an upper region, an intermediate region, a lower region, an inner surface and an outer surface; (b) a signage engaging member having an upper region, an intermediate region, a lower region, an inner surface and an outer surface; (c) wherein the upper region of the substrate engaging member and the upper region of the signage engaging member are releasably secured to each other; and (d) wherein the lower region of the substrate engaging member includes a segment that regulates positioning of the lower region of the signage engaging member.

In a preferred embodiment of the present invention, the upper region of the substrate engaging member comprises a first substantially horizontal segment, a second substantially horizontal segment, a substantially vertical segment, a substantially c-shaped detent/catch, and an open aperture.

In another preferred embodiment of the present invention, the intermediate region of the substrate engaging member comprises a generally vertical segment which is generally orthogonal to the first and second substantially horizontal segments of the upper region of the substrate engaging back member.

In yet another preferred embodiment of the present invention, the lower region of the substrate engaging back member comprises a first substantially horizontal segment, a second substantially horizontal segment, a substantially vertical segment, and open aperture.

In another aspect of the present invention, the upper region of the signage engaging member comprises a substantially horizontal segment having an open aperture, a substantially vertical post, a first intermediate L-shaped tab, a second intermediate L-shaped tab, and a terminal L-shaped tab.

Preferably, the intermediate region of the signage engaging member comprises a substantially vertical segment which is generally orthogonal to the substantially horizontal segment of the upper region of the signage engaging member.

In a preferred embodiment of the present invention, the lower region of the signage engaging member comprises a substantially horizontal segment having an open aperture, a pair of substantially vertical upward intermediate posts, and a substantially vertical downward terminal post.

The present invention is also directed to, in one embodiment, an electrical raceway assembly, comprising, consisting essentially of and/or consisting of: (a) a substrate engaging member having an upper region, an intermediate region, a lower region, an inner surface and an outer surface; (b) a signage engaging member having an upper region, an intermediate region, a lower region, an inner surface and an outer surface; (c) wherein the upper region of the substrate engaging member comprises a first substantially horizontal segment, a second substantially horizontal segment, a substantially vertical segment, a substantially c-shaped detent/catch, and an open aperture; (d) wherein the intermediate region of the substrate engaging member comprises a generally vertical segment which is generally orthogonal to the first and second substantially horizontal segments of the upper region of the substrate engaging member; (e) wherein the lower region of the substrate engaging back member comprises a first substantially horizontal segment, a second substantially horizontal segment, a substantially vertical segment, and an open aperture; (f) wherein the upper region of the signage engaging member comprises a substantially horizontal segment having an open aperture, a substantially vertical post, a first intermediate L-shaped tab, a second intermediate L-shaped tab, and a terminal L-shaped tab; (g) wherein the intermediate region of the signage engaging member comprises a substantially vertical segment which is generally orthogonal to the substantially horizontal segment of the upper region of the signage engaging member; and (h) wherein the lower region of the signage engaging member comprises a substantially horizontal segment having an open aperture, a pair of substantially vertical upward intermediate posts, and a substantially vertical downward terminal post.

BRIEF DESCRIPTION OF THE DRAWINGS

The invention will now be described with reference to the drawings wherein.

DETAILED DESCRIPTION OF THE INVENTION

Figure 1:
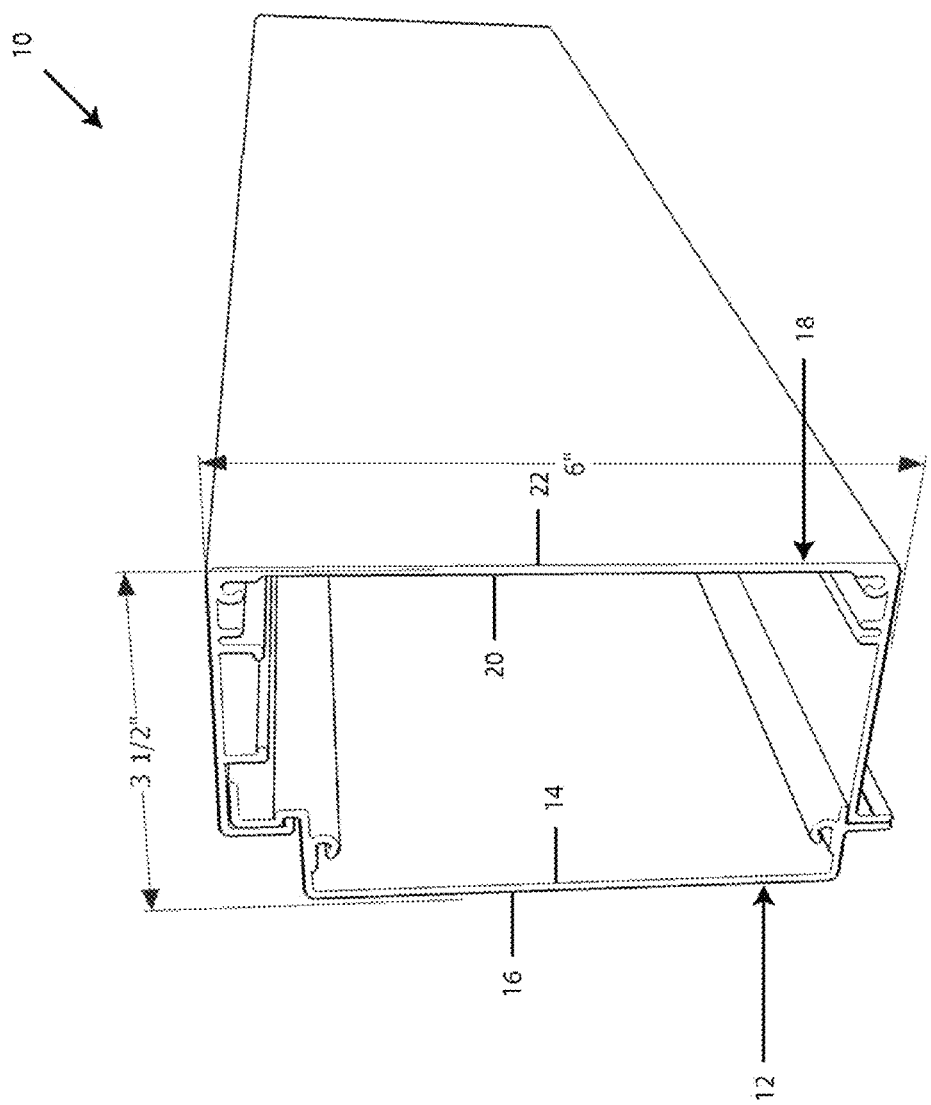
FIG. 1 of the drawings is an isometric view illustrating the front right portion of an electrical raceway assembly fabricated in accordance with the present invention.

While this invention is susceptible of embodiment in many different forms, there is shown in the drawings and will be described herein in detail, one or more specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

In accordance with the present invention, the raceway assemblies disclosed herein facilitate efficient assembly, installation, service, and maintenance of, for example, illuminated signage by utilizing a two-piece assembly including a substrate engaging member and a signage engaging member that is releasably interconnected to the substrate engaging member to, in turn, form an elongated raceway channel for retaining a plurality of components therein.

Figure 2:
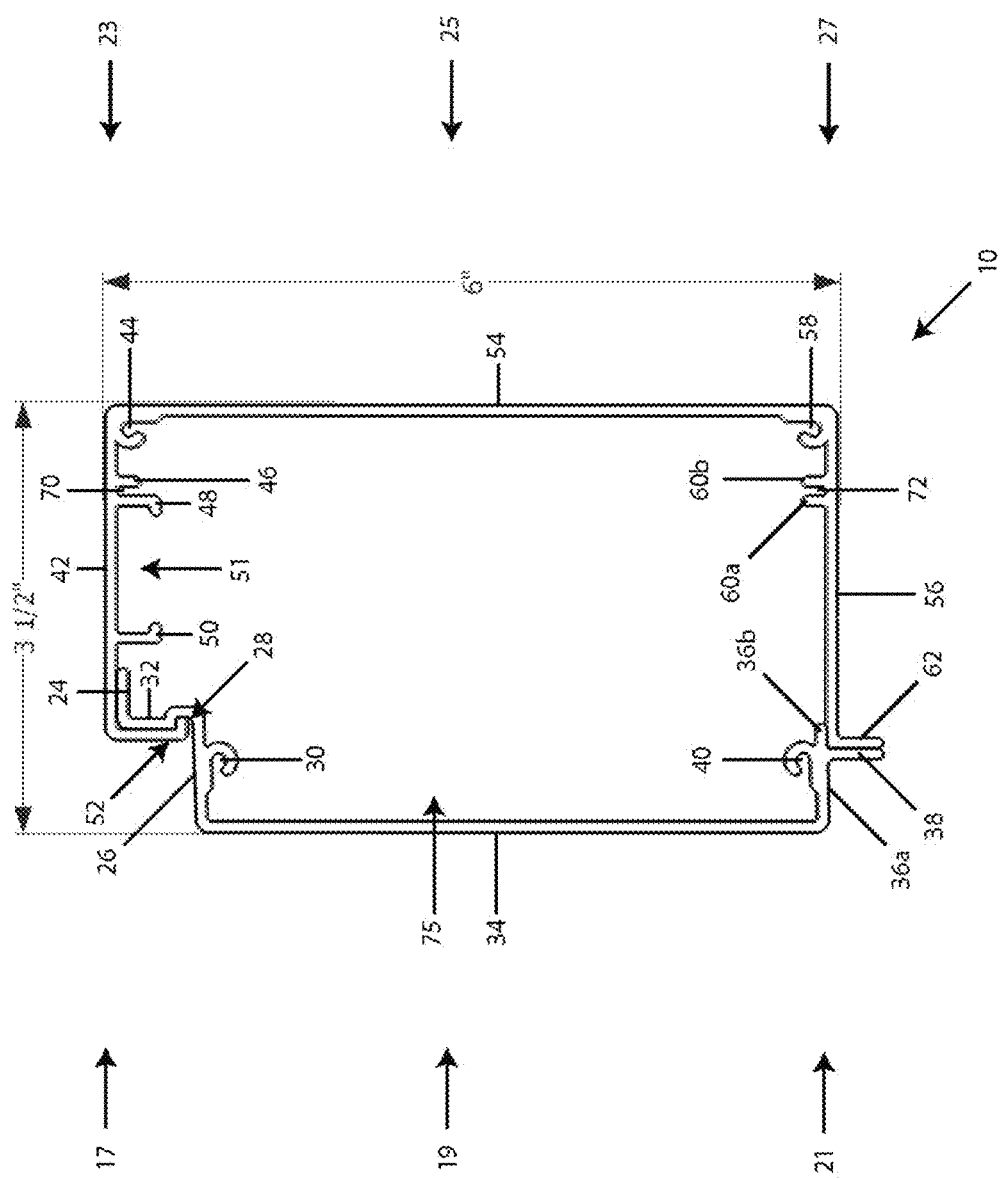
FIG. 2 of the drawings is an end view of the electrical raceway assembly of FIG. 1 without an end cap member.

Referring now to the drawings, and to FIGS. 1 and 2 in particular, raceway assembly 10 (e.g., an electrical raceway assembly for illuminated signage) is shown which generally comprises substrate engaging back member/plate 12 having an inner surface 14 and an outer surface 16, and signage engaging member/plate 18 having inner surface 20 and outer surface 22.

Substrate engaging back plate 12 preferably comprises upper region 17, intermediate region 19, and lower region 21. Upper region 17 of substrate engaging back plate 12 preferably includes substantially horizontal segments 24 and 26, substantially c-shaped detent/catch 28 for releasably receiving an upper region of signage engaging plate 18 therein, and open aperture 30 (e.g., generally c-shaped aperture) for releasably receiving an end cap fastener therein. Substantially vertical segment 32 is positioned between substantially horizontal segments 24 and 26.

Intermediate region 19 of substrate engaging back plate 12 preferably comprise a generally vertical segment 34 which is generally orthogonal to substantially horizontal segments 24 and 26 of upper region 17. In use, generally vertical segment 34 is secured to a substrate (e.g., an internal or external wall, a barrier, a partition, an enclosure, a screen, a panel, a divider, a bulkhead, etcetera), preferably via fasteners.

Lower region 21 of substrate engaging back plate 12 preferably includes substantially horizontal segments 36a and 36b, substantially vertical segment 38, and open aperture 40 (e.g., generally c-shaped aperture) for releasably receiving an end cap fastener therein. Open aperture 40 is positioned between substantially horizontal segment 36a and substantially horizontal segment 36b. Substantially horizontal segment 36b and substantially vertical segment 38 collectively form an L-shaped member that, in use, contacts an L-shaped member of signage engaging plate 18.

In a preferred embodiment of the present invention substrate engaging back plate 12 is fabricated from metals (e.g., aluminum, steel including stainless steel, transition metals, and alloys of the same), non-metals, ceramics, wood, plastics, and glass—just to name a few.

Referring once again to FIGS. 1 and 2, signage engaging plate 18 of raceway assembly 10 preferably comprises upper region 23, intermediate region 25, and lower region 27. Upper region 23 of signage engaging plate 18 preferably includes substantially horizontal segment 42, having open aperture 44 (e.g., generally c-shaped aperture), a generally vertical post 46, first internal L-shaped tab 48, second internal L-shaped tab 50, and terminal L-shaped tab 52.

In one embodiment of the present invention, post 46 and tab 48 form a channel for containing the upper portion of a transformer pan or plate. Furthermore, first internal L-shaped tab 48 and second internal L-shaped tab 50 collectively form channel 51 for containing a slidable member therein, such as a lifting block retention guide member. In another aspect of the present invention, the inner surface of terminal L-shaped tab 52 of signage engaging plate 18 matingly engages the outer surfaces of substantially horizontal segments 24, substantially c-shaped detent/catch 28, and substantially vertical segment 32 of substrate engaging back plate 12.

Intermediate region 25 of signage engaging plate 18 preferably comprises generally vertical segment 54 which is generally orthogonal to substantially horizontal segment 42. As will be discussed in greater detail below, signage is typically, releasably secured to generally vertical segment 54.

Lower region 27 of signage engaging plate 18 preferably includes substantially horizontal segment 56, open aperture 58 (e.g., generally c-shaped aperture), a pair of generally upward vertical posts 60, and a generally downward terminal post 62. In another aspect of the present invention, the inner surface of generally downward terminal post 62 contacts the inner surface of substantially vertical segment 38 of substrate engaging back plate 12.

In a preferred embodiment of the present invention signage engaging plate 18 is fabricated from metals (e.g., aluminum, steel including stainless steel, transition metals, and alloys of the same), non-metals, ceramics, wood, plastics, and glass—just to name a few.

In accordance with the present invention, open apertures 44 and 58 of signage engaging plate 18 are configured to releasably secure a front connector/healer plate. Furthermore, post 46 and internal L-shaped tab 48 of upper region 23 of signage engaging plate 18 collectively form slot 70, and posts 60a and 60b of lower region 27 of signage engaging plate 18 form slot 72. Slots 70 and 72 of upper and lower regions 23 and 27 of signage engaging plate 18, respectively, releasably secure a transformer pan/plate having a transformer (e.g., an LED transformer) associated therewith. Moreover, horizontal segment 26 and open aperture 30 of upper region 17 of substrate engaging back plate 12, generally vertical segment 34 of intermediate region 19 of substrate engaging back plate 12, and horizontal segment 36a and open aperture 40 of lower region 21 of substrate engaging back plate 12 collectively form channel 75 for releasably securing a rear connector/healer plate.

Figure 3:
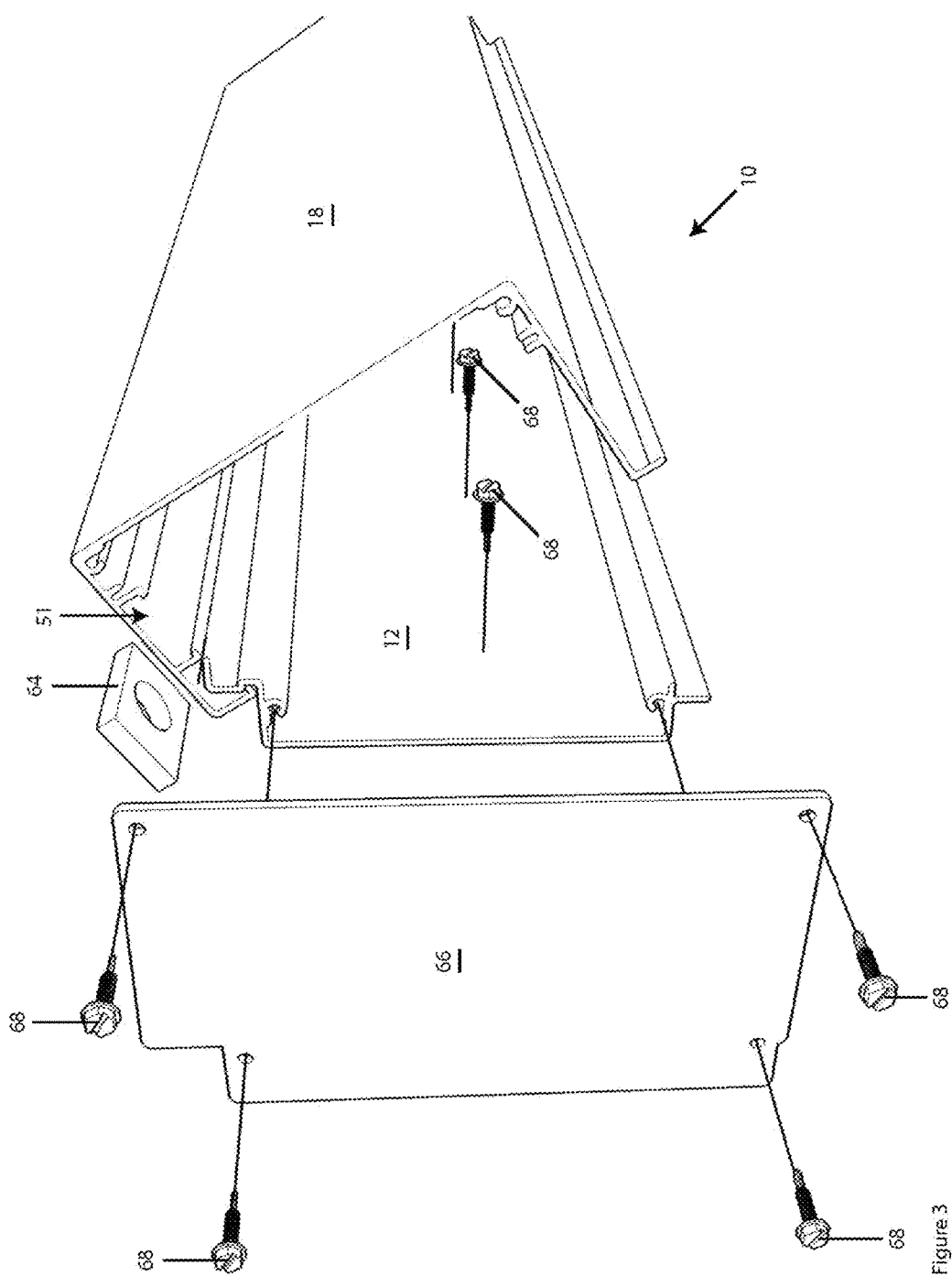
FIG. 3 of the drawings is an isometric view illustrating the front right portion of the electrical raceway assembly of FIG. 1 in a partially assembled configuration showing, among other things, an end cap member, end cap fasteners, substrate engaging fasteners; and a lifting block retention guide member.

As is best shown in FIG. 3, first internal L-shaped tab 48 and second internal L-shaped tab 50 of signage engaging plate 18 collectively form channel 51 for containing lifting block retention guide member 64 therein. Lifting block retention guide member 64 is preferably configured to retention of, for example, an I-bolt, a catch, a latch, etcetera. End cap member 66 is preferably secured to the ends of raceway assembly 10 via conventional fasteners 68 positioned within open apertures 30, 40, 44, and 58. As is also shown in FIG. 3, substrate engaging back plate 12 is secured to a substrate via conventional fasteners 68.

Figure 4:
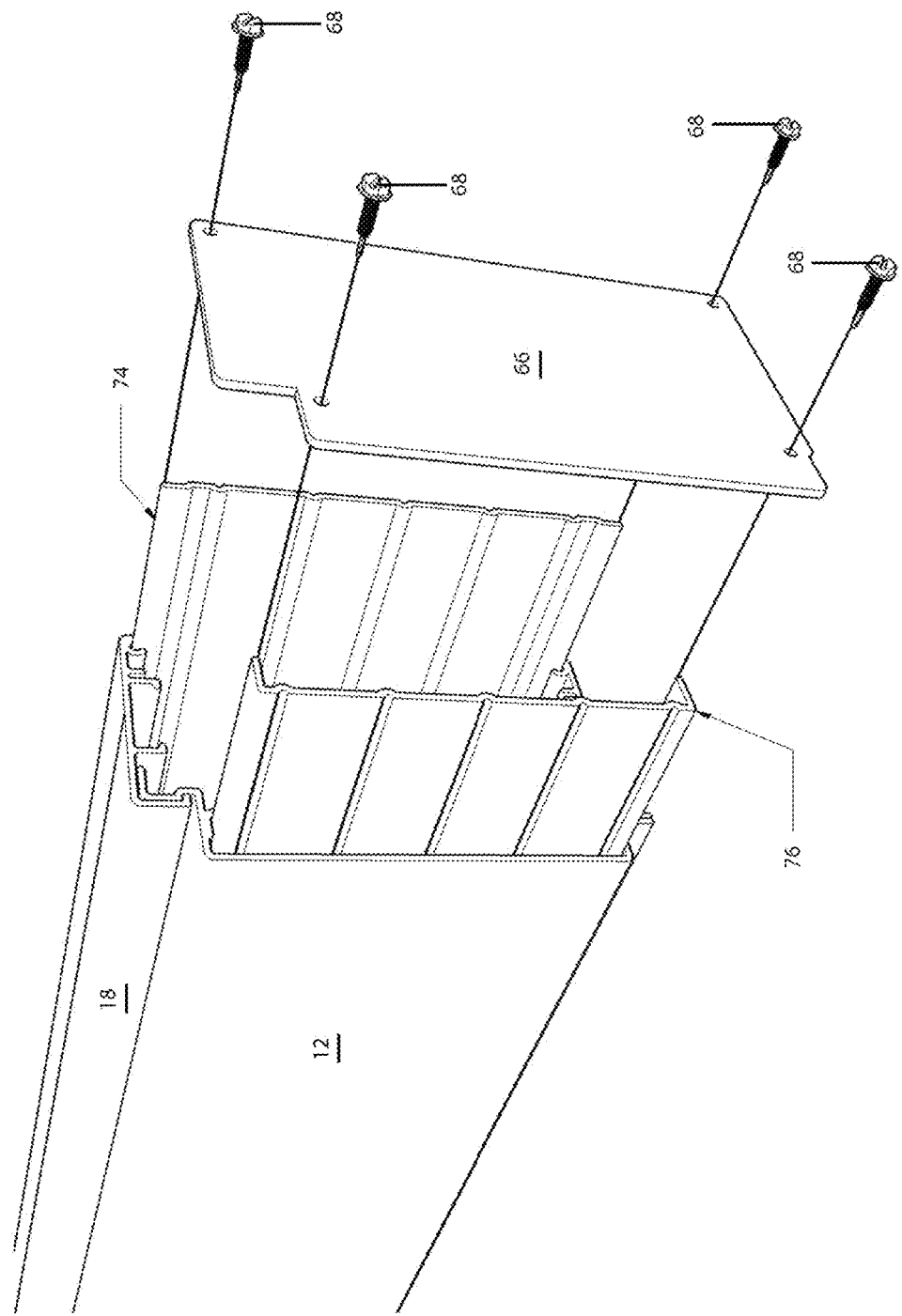
FIG. 4 of the drawings is an isometric view illustrating the rear right portion of the electrical raceway assembly of FIG. 1 showing, among other things, an end cap member, a rear connector/healer plate, and a front connector/healer plate.

Referring now to FIG. 4, front connector/healer plate 74 is slidably and releasably secured in open apertures 44 and 58 of signage engaging plate 18, and rear connector/healer plate 76 is slidably and releasably secured in channel 75 of substrate engaging back plate 12. Front and rear connector plates 74 and 76, respectively, serve as a means to extend the length of raceway assembly 10 when more than one section of substrate engaging back member 12 and signage engaging member 18 are utilized. Front connector plate 74 is preferably secured to signage engaging member 18 via adhesive, and rear connector plate 76 is also preferably secured to substrate engaging member 12 via adhesive.

Figure 5:
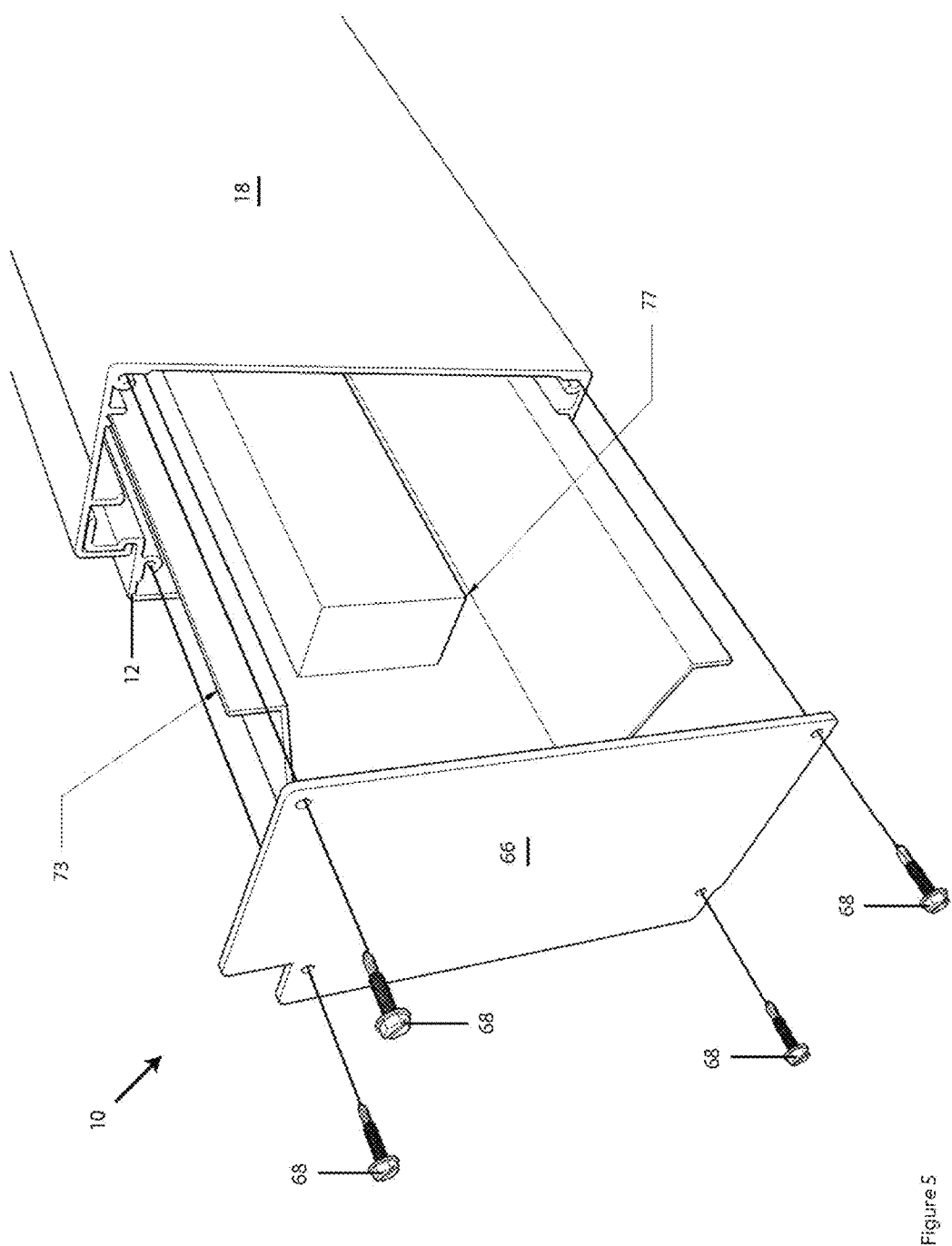
FIG. 5 of the drawings is an isometric view illustrating the front right portion of the electrical raceway assembly of FIG. 1 showing, among other things, a slide in transformer pan, and an LED transformer.

As is best shown in FIG. 5, transformer plate 73 contains transformer 77 and is slidably and releasably secured within slots 70 and 72 of upper and lower regions 23 and 27, respectively, of signage engaging member 18.

Figure 6:
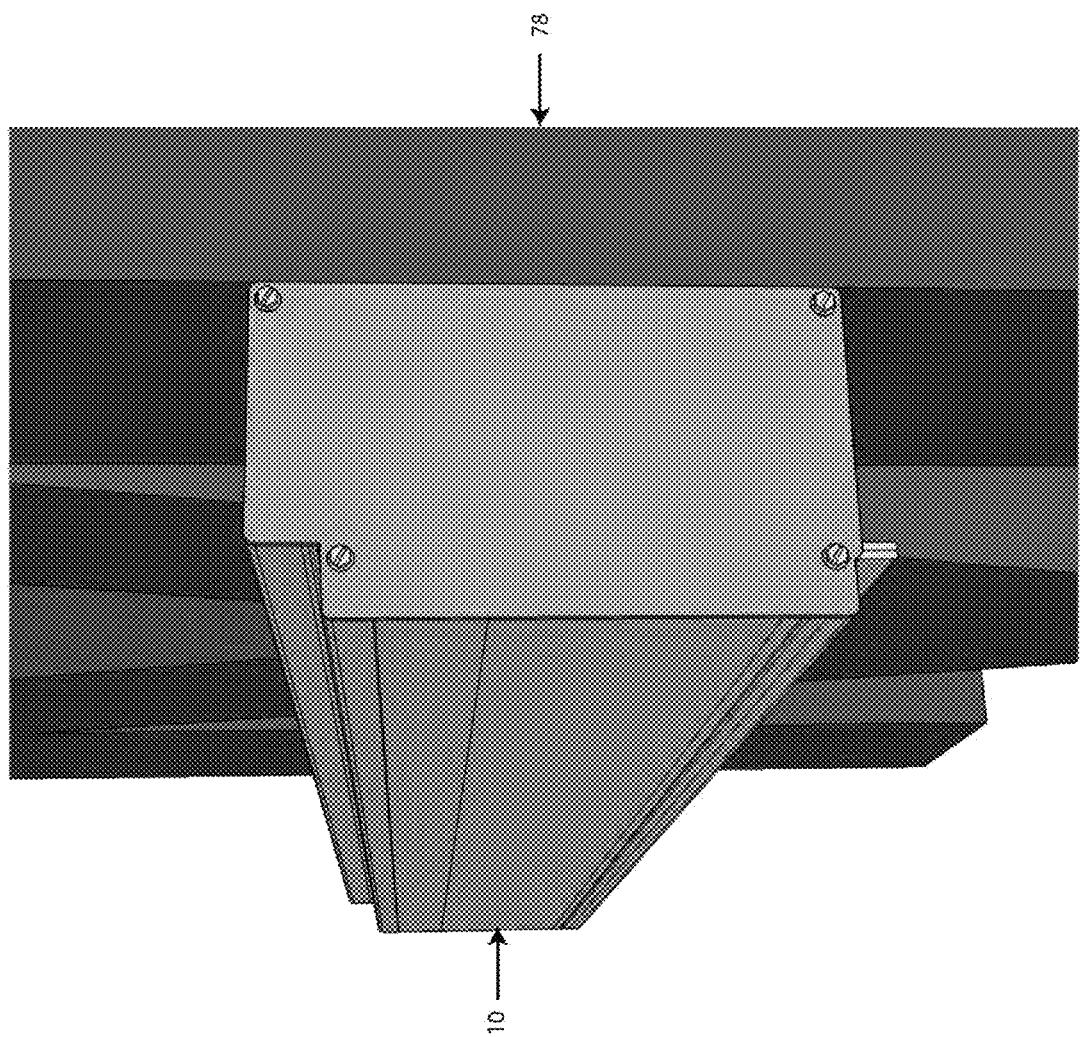
FIGS. 6-8 of the drawings are isometric views of the electrical raceway assembly of FIG. 1 associated with illuminated signage.
Figure 7:
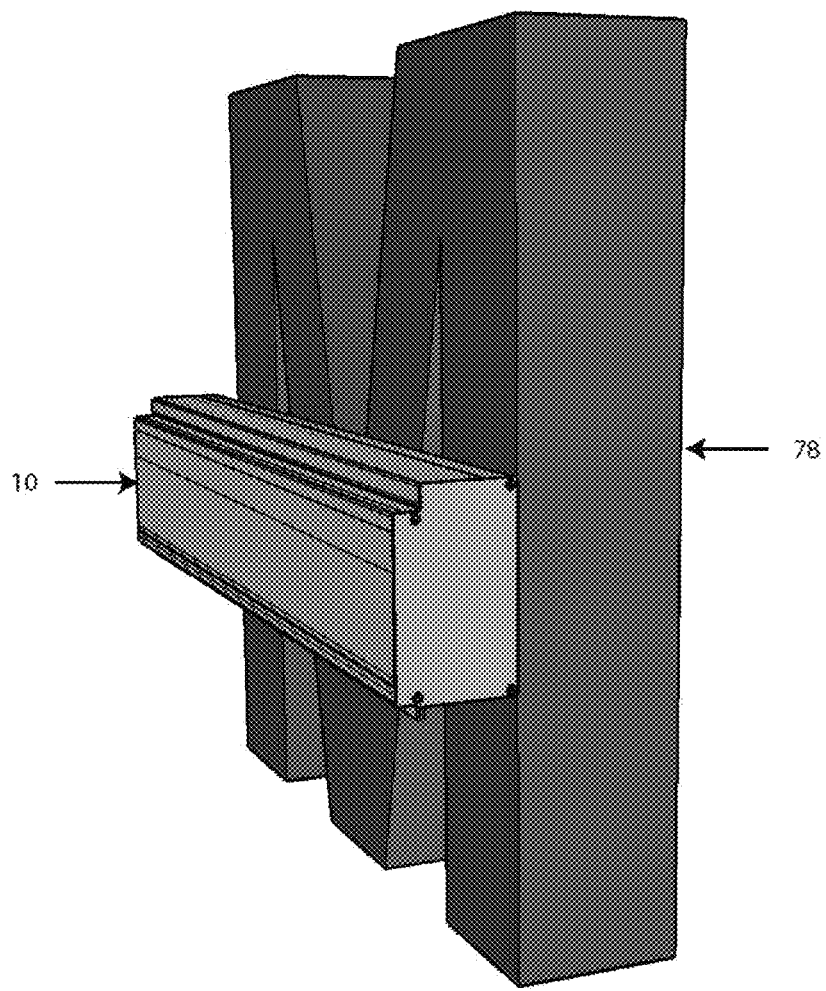

Referring now to FIGS. 6 and 7, raceway assembly 10 is preferably configured for securement to illuminated signage. In particular, illuminated signage is secured to outer surface 22 of signage engaging member 18.

Figure 8:
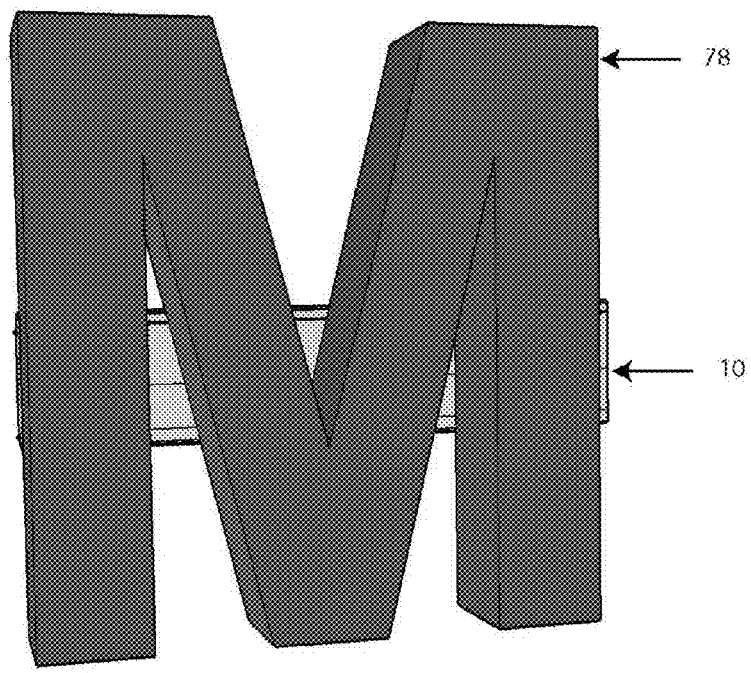

In operation, illuminated signage 78 (FIGS. 6-8) is preferably secured to outer surface 22 of signage engaging member 18. Such securement can occur at a manufacturing site so as to avoid complications associated with securing the illuminated signage (e.g., a plurality of letters or symbols) at an installation site. Next, substrate engaging back plate/member 12 is secured to a substrate (e.g., an internal or external wall, a barrier, a partition, an enclosure, a screen, a panel, a divider, a bulkhead, etcetera), preferably via fasteners and/or adhesive. Third, signage engaging member 18 is connectively secured to substrate engaging back member (See FIGS. 1-3). Notably, such securement can occur without any fasteners and/or adhesive. It will be understood that the incorporation of accessory components can occur at different times—depending upon the type of installation.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A two-piece electrical raceway assembly that forms an enclosure, consisting of:
   a first piece, wherein the first piece is a substrate engaging member having an upper region that includes a first substantially horizontal segment having an upper surface and a lower surface, an intermediate region, a lower region, an inner surface and an outer surface;
   a second piece, wherein the second piece is a signage engaging member having an upper region that includes a first substantially horizontal segment having an upper surface and a lower surface, an intermediate region, a lower region, an inner surface and an outer surface;
   wherein at least a portion of the upper surface of the first substantially horizontal segment of the substrate engaging member directly contacts at least a portion of the lower surface of the first substantially horizontal segment of the signage engaging member; wherein the upper region of the substrate engaging member and the upper region of the signage engaging member are releasably secured to each other; wherein the lower region of the substrate engaging member includes a segment that regulates positioning of the lower region of the signage engaging member; and wherein the segment is positioned below and outside of the enclosure.

2. The electrical raceway assembly according to claim 1, wherein the upper region of the substrate engaging member further comprises, a second substantially horizontal segment, a substantially vertical segment, a substantially c-shaped detent/catch, and a fastener aperture, wherein the fastener aperture is positioned below the first substantially horizontal segment and the second substantially horizontal segment, and wherein the substantially c-shaped detent/catch is positioned below the first substantially horizontal segment and formed by a portion of the substantially vertical segment and a portion of the second substantially horizontal segment.

3. The electrical raceway assembly according to claim 2, wherein the intermediate region of the substrate engaging member comprises a substantially vertical segment which is generally orthogonal to the first and second substantially horizontal segments of the upper region of the substrate engaging member, and wherein the substantially vertical segment of the intermediate region emanates contiguously from the second substantially horizontal segment of the upper region of the substrate engaging member.

4. The electrical raceway assembly according to claim 3, wherein the lower region of the substrate engaging member comprises a first substantially horizontal segment positioned adjacent to the substantially vertical segment of the intermediate region, a second substantially horizontal segment, a substantially vertical and downward emanating segment positioned between the first substantially horizontal segment and the second substantially horizontal segment, and a fastener aperture.

5. The electrical raceway assembly according to claim 4, wherein the upper region of the signage engaging member comprises a substantially horizontal segment positioned above the first and second substantially horizontal segments of the upper region of the substrate engaging member having a fastener aperture, a substantially vertical post, a first intermediate L-shaped tab, a second intermediate L-shaped tab, and a terminal L-shaped tab.

6. The electrical raceway assembly according to claim 5, wherein the intermediate region of the signage engaging member comprises a substantially vertical segment which is generally orthogonal to the substantially horizontal segment of the upper region of the signage engaging member.

7. The electrical raceway assembly according to claim 6, wherein the lower region of the signage engaging member comprises a substantially horizontal segment having a fastener aperture, a pair of substantially vertical upward intermediate posts positioned horizontally adjacent to one another, and a substantially vertical downward terminal post that contacts the substantially vertical and downward emanating segment of the lower region of the substrate engaging member.

8. The electrical raceway assembly according to claim 1, wherein the intermediate region of the substrate engaging member comprises a generally vertical segment which is generally orthogonal to the first and second substantially horizontal segments of the upper region of the substrate engaging member.

9. The electrical raceway assembly according to claim 1, wherein the lower region of the substrate engaging member comprises a first substantially horizontal segment, a second substantially horizontal segment, a substantially vertical segment, and a fastener aperture.

10. The electrical raceway assembly according to claim 1, wherein the upper region of the signage engaging member comprises a substantially horizontal segment having a fastener aperture, a substantially vertical post, a first intermediate L-shaped tab, a second intermediate L-shaped tab, and a terminal L-shaped tab.

11. The electrical raceway assembly according to claim 1, wherein the intermediate region of the signage engaging member comprises a substantially vertical segment which is generally orthogonal to the substantially horizontal segment of the upper region of the signage engaging member.

12. The electrical raceway assembly according to claim 1, wherein the lower region of the signage engaging member comprises a substantially horizontal segment having an open aperture, a pair of substantially vertical upward intermediate posts, and a substantially vertical downward terminal post.

13. An electrical raceway assembly that forms an enclosure, comprising:
a substrate engaging member having an upper region that comprises a first substantially horizontal segment having an upper surface and a lower surface, an intermediate region, a lower region, an inner surface and an outer surface;
a signage engaging member having an upper region that comprises a first substantially horizontal segment having an upper surface and a lower surface, an intermediate region, a lower region, an inner surface and an outer surface;
wherein at least a portion of the upper surface of the first substantially horizontal segment of the substrate engaging member directly contacts at least a portion of the lower surface of the first substantially horizontal segment of the signage engaging member;
wherein the upper region of the substrate engaging member further comprises a second substantially horizontal segment, a substantially vertical segment, a substantially c-shaped detent/catch, and an open aperture;
wherein the intermediate region of the substrate engaging member comprises a generally vertical segment which is generally orthogonal to the first and second substantially horizontal segments of the upper region of the substrate engaging member;
wherein the lower region of the substrate engaging member comprises a first substantially horizontal segment, a second substantially horizontal segment, a substantially vertical segment that is positioned below and outside of the enclosure, and an open aperture;
wherein the upper region of the signage engaging member comprises a substantially horizontal segment having an open aperture, a substantially vertical post, a first intermediate L-shaped tab, a second intermediate L-shaped tab, and a terminal L-shaped tab;
wherein the intermediate region of the signage engaging member comprises a substantially vertical segment which is generally orthogonal to the substantially horizontal segment of the upper region of the signage engaging member; and
wherein the lower region of the signage engaging member comprises a substantially horizontal segment having an open aperture, a pair of substantially vertical upward intermediate posts, and a substantially vertical downward terminal post that is positioned below and outside of the enclosure.

* * * * *